(12) United States Patent
Griggs

(10) Patent No.: US 6,609,879 B2
(45) Date of Patent: Aug. 26, 2003

(54) METHOD AND APPARATUS FOR VACUUM BAGGING A COMPONENT HAVING A PARTIAL FLANGE

(75) Inventor: Philip Robert Griggs, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 50 days.

(21) Appl. No.: 09/990,744

(22) Filed: Nov. 14, 2001

(65) Prior Publication Data

US 2003/0091426 A1 May 15, 2003

(51) Int. Cl.[7] .............................................. F01D 25/16
(52) U.S. Cl. ...................... 415/1; 415/121.3; 415/229
(58) Field of Search ................................. 415/110, 111, 415/112, 121.3, 229, 1

(56) References Cited

U.S. PATENT DOCUMENTS

| | | |
|---|---|---|
| 4,755,403 A | 7/1988 | Ferguson |
| 4,765,857 A | 8/1988 | Ferguson |
| 5,039,533 A | 8/1991 | Comer |
| 6,183,791 B1 | 2/2001 | Williams et al. |
| 6,254,909 B1 | 7/2001 | Williams et al. |
| 2002/0144401 A1 * | 10/2002 | Nogueroles Vines et al. ........................ 29/897.2 |

* cited by examiner

Primary Examiner—Edward K. Look
Assistant Examiner—Richard A. Edgar
(74) Attorney, Agent, or Firm—V. G. Ramaswamy; Sonnenschein Nath & Rosenthal

(57) ABSTRACT

In combination, a gas turbine engine component having a centerline and a partial flange for connecting the component to the gas turbine engine extending only partially around the centerline and terminating in spaced apart ends of the flange, and a support element releasably attachable to the flange and extending between the ends of the flange for bridging the ends of the flange to prevent the ends from puncturing a vacuum bag when installed around the flange and to prevent the vacuum bag from distorting the component.

8 Claims, 4 Drawing Sheets

METHOD AND APPARATUS FOR VACUUM BAGGING A COMPONENT HAVING A PARTIAL FLANGE

BACKGROUND OF THE INVENTION

The present invention relates generally to vacuum bagging, and more particularly to a method and apparatus for vacuum bagging a component without distorting the component or damaging the bag.

Many stationary structures are made from elements which are bonded together. One such structure is a seal support structure of a gas turbine engine. This support structure has annular seals which become worn or damaged, and must be replaced. Adhesives are frequently used to bond replacement seals to the support structure. In some instances, pressure is applied to the seals to hold them in position as the adhesive cures. Several means are available for applying pressure to the seals including vacuum bags, inflatable pressure bladders or expandable mechanical fixtures. Of these alternatives, the latter two are more expensive and require longer lead times to manufacture. Thus, vacuum bags may be preferred. However, some seal support structures have sharp edges which can puncture the vacuum bags. Further, some support structures can be distorted beyond engineering specifications under the loads applied by a vacuum bag as the adhesive cures. One such seal support structure which has sharp edges and can be distorted is illustrated in FIG. 1.

FIG. 1 shows a partially disassembled stationary oil seal assembly of a gas turbine engine which is designated in its entirety by the reference number 10. The assembly 10 includes mating bevel gears 12, 14 mounted in a sump housing formed by two housing components generally designated by 16, 18 having flanges generally designated by 20, 22, respectively, for joining the components with bolts (not shown). As shown in FIG. 1, the flanges 20, 22 extend only partially around a centerline 24 of the respective components 16, 18. The forward component 16 includes a generally cylindrical seal housing 26 connected to the partial flange 20 by a conical section 28 which extends only partially around the centerline 24 of the component. Forward and aft abradable seals 30, 32 are mounted inside the cylindrical seal housing 26 of the component as illustrated in FIG. 2. Over extended use, the seals 30, 32 become worn or damaged and must be replaced by bonding replacement seals to the component 16.

Because the flange 20 extends only partially around the centerline 24 of the component 16 as shown in FIG. 1, the flange has opposing spaced apart ends 34, 36 presenting sharp edges which can puncture a vacuum bag. Further, because the conical section 28 extends only partially around the centerline 24 of the component 16, the flange 20 and/or conical section can be distorted by the vacuum bag causing the repaired component to be out of engineering specifications. Although the illustrated component is a CFM56 gas turbine engine No. 3 bearing stationary oil seal, those skilled in the art will appreciate that the method and apparatus described herein may be applied to other components without departing from the scope of the present invention.

SUMMARY OF THE INVENTION

Among the several features of the present invention may be noted the provision of a component having a centerline and a partial flange extending only partially around the centerline and terminating in spaced apart ends of the flange, and a support element releasably attached to the flange and extending between the ends of the flange for bridging the ends of the flange to prevent the ends from puncturing a vacuum bag when installed around the flange and to prevent the vacuum bag from distorting the component.

In another aspect, the present invention includes a method of preparing a gas turbine engine component for vacuum bagging. The method comprises the step of attaching a support element to the flange to bridge the ends of the flange thereby preventing the ends from puncturing the vacuum bag and preventing the vacuum bag from distorting the component.

Other features of the present invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENT

Figure 1:
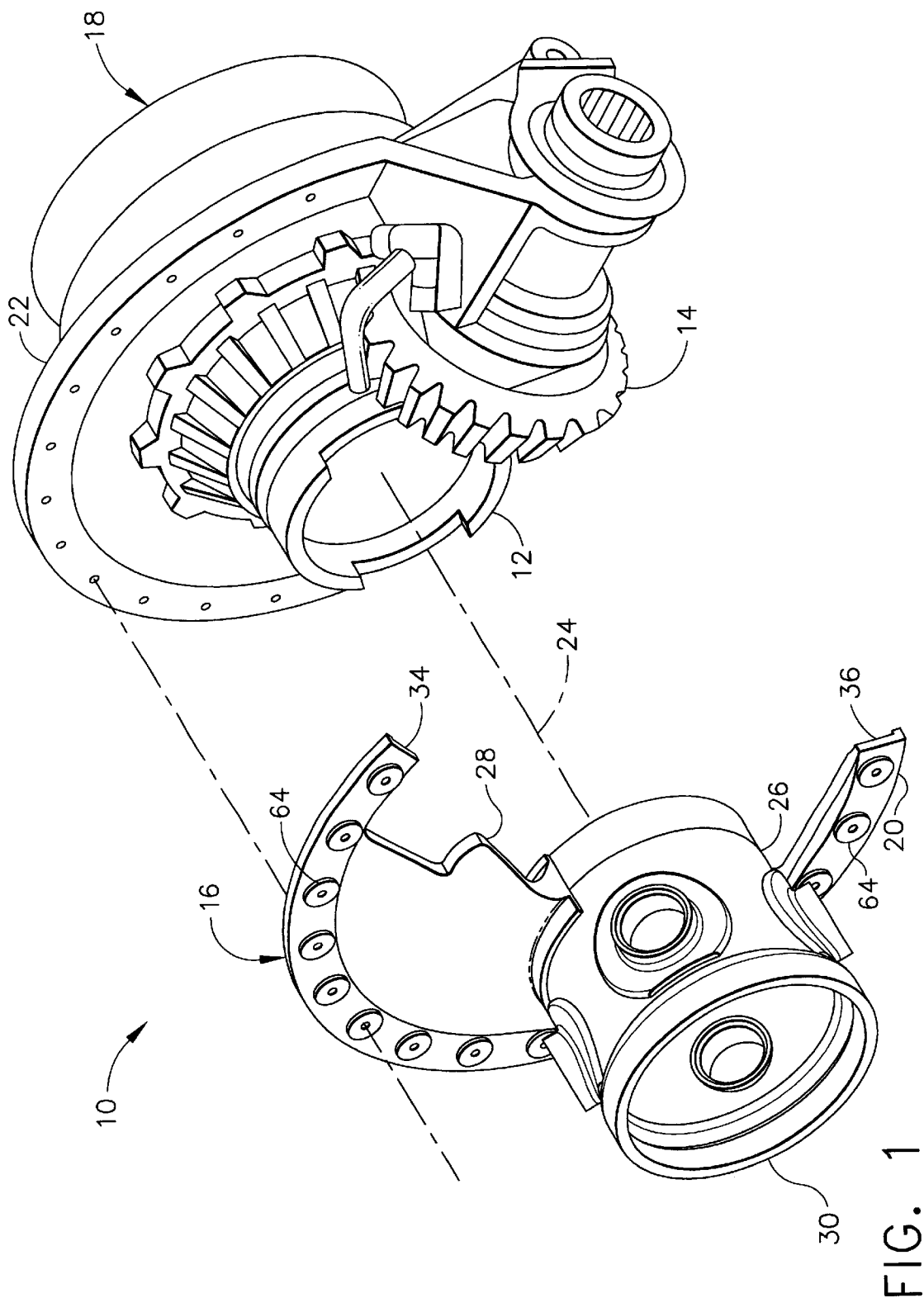
FIG. 1 is a perspective of a partially disassembled gas turbine engine component having a partial flange.
Figure 2:
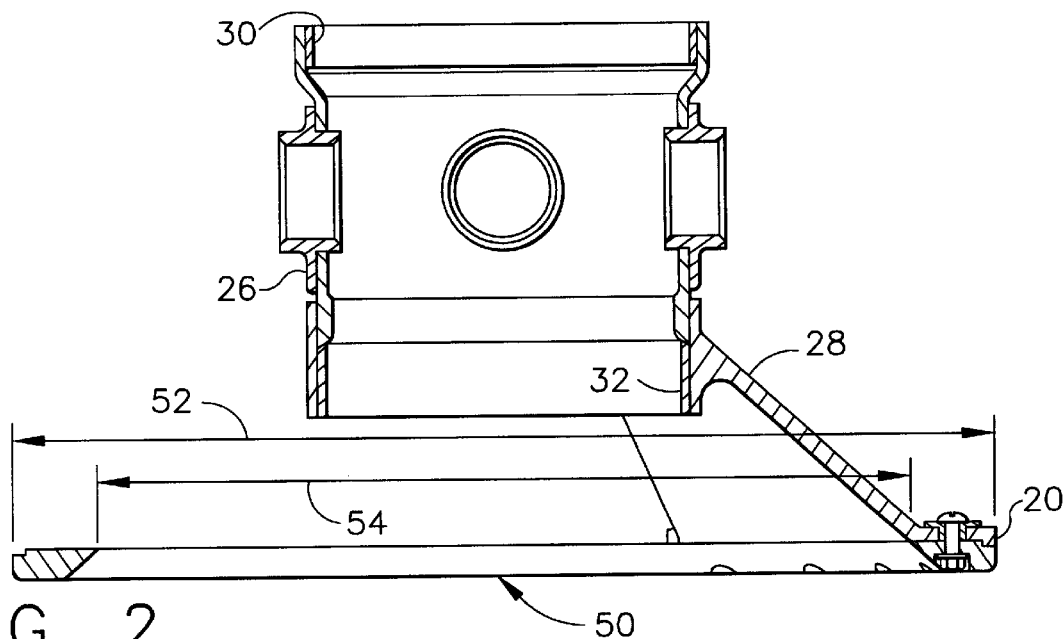
FIG. 2 is a vertical section through a component having a support element of a first embodiment attached thereto.

Referring now to the drawings and in particular to FIGS. 1 and 2, an engine component such as a forward housing of a CFM56 gas turbine engine No. 3 bearing stationary oil seal is designated in its entirety by the reference numeral 16. The component 16 comprises a flange 20 which extends only partially around a centerline 24 of the component. Further, the component 16 includes a generally cylindrical seal housing 26 and a conical section 28 positioned between the flange 20 and the seal housing. Like the flange 20, the conical section 28 extends only partially around a centerline 24 of the component 16. Forward and aft abradable seals 30, 32 are mounted inside the cylindrical seal housing 26 of the component 16. When the component 16 is used over an extended period, the seals 30, 32 become worn or damaged. The component 16 may then be repaired by removing the worn or damaged seals 30, 32 and replacing them by bonding replacement seals to the component 16 with adhesive (not shown). The replacement seals 30, 32 are clamped to the component 16 as the adhesive cures.

Figure 3:
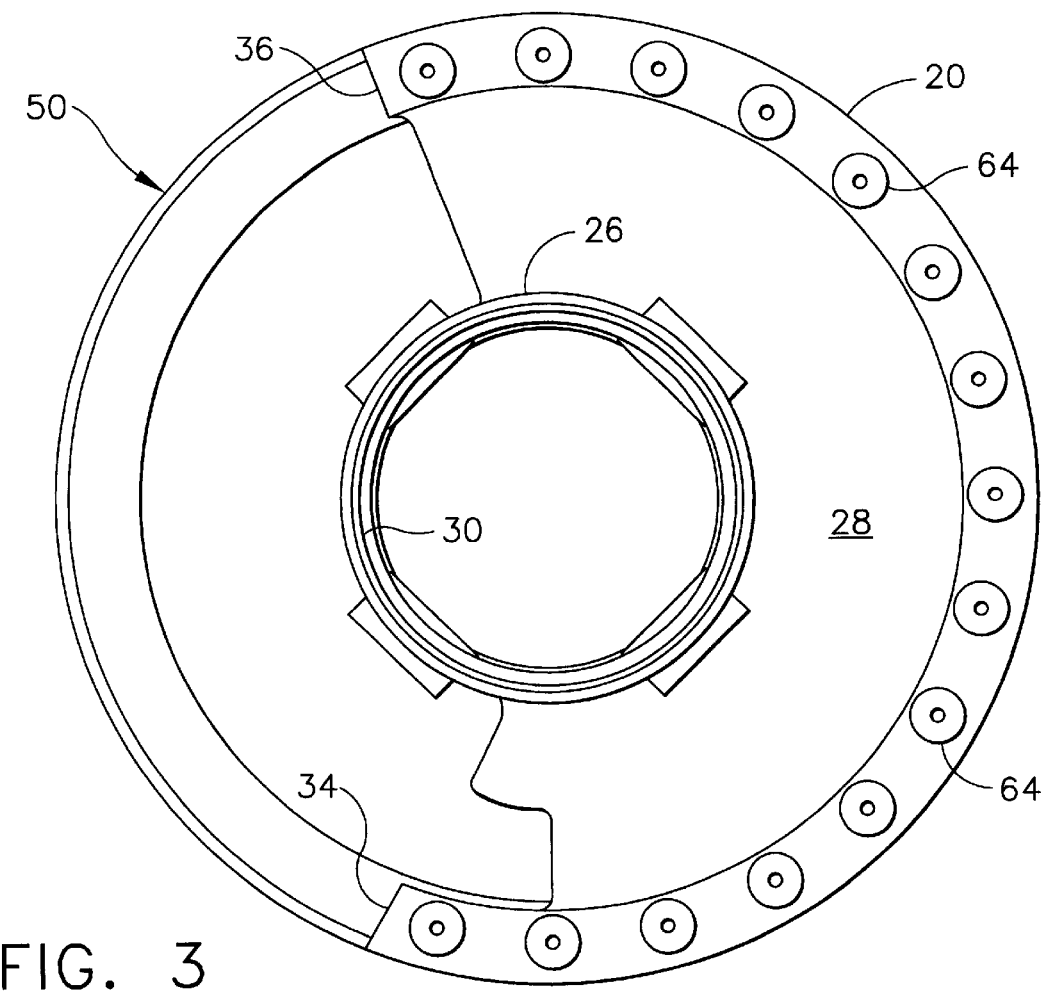
FIG. 3 is an end elevation of the component and support element.
Figure 4:
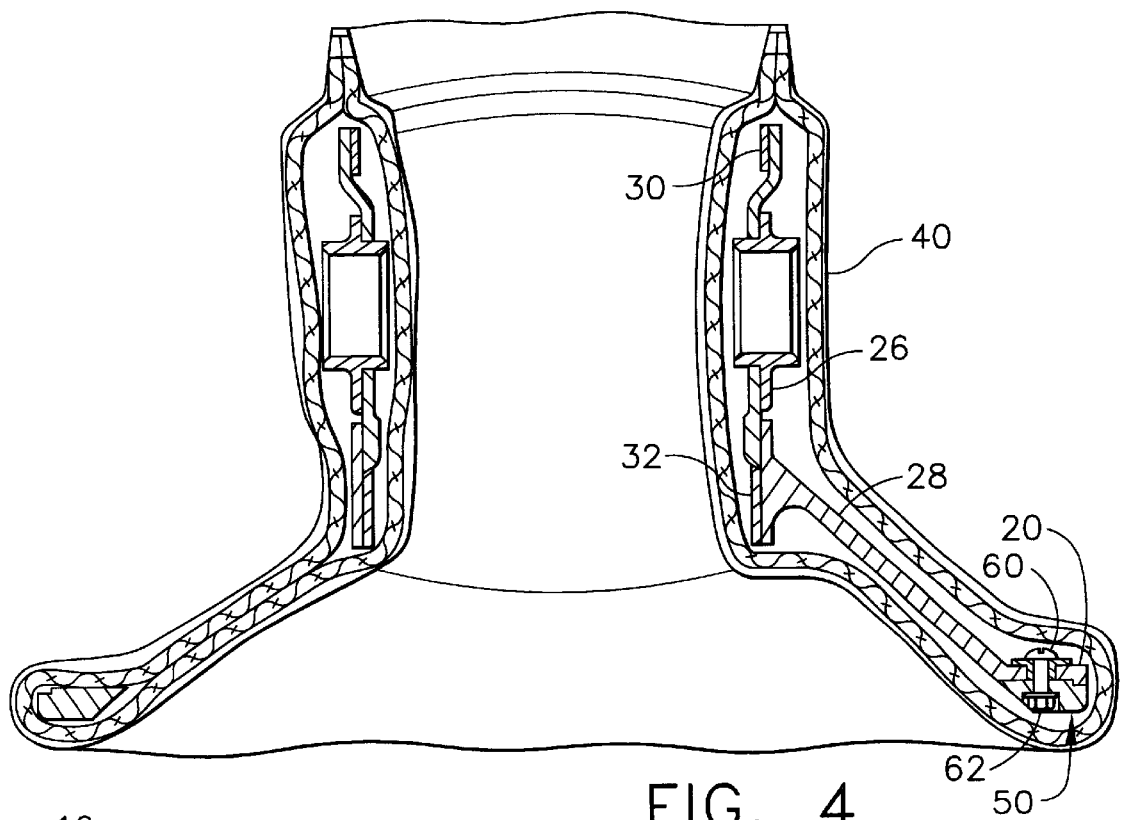
FIG. 4 is a vertical section of the component and support element surrounded by a vacuum bag.

In one preferred embodiment, the seals 30, 32 are clamped to the component 16 using a vacuum bag 40 (FIG. 4). There are several features of the component 16 which make it difficult to use a vacuum bag 40 when bonding the replacement seals 30, 32 to the component. Because the flange 20 is a partial flange (i.e., it extends only partially around the centerline 24 of the component 16), the flange terminates in opposing spaced apart ends 34, 36 as shown in FIG. 3 presenting sharp edges which can puncture the vacuum bag. Further, because the flange 20 and conical section 28 extend only partially around the centerline 24 of the component 16, the flange and/or conical section can be distorted beyond manufacturing specifications under the loading applied by the vacuum bag 40.

To alleviate these problems, in one embodiment of the present invention a support element, generally designated by 50, is attached to the flange 20 of the component 16 so it extends between the opposing ends 34, 36 of the flange as illustrated in FIGS. 2 and 3. The element 50 bridges the opposing ends 34, 36 of the flange 20 to prevent the ends from puncturing the vacuum bag 40 (FIG. 4) when installed around the flange. As will further be appreciated by those skilled in the art, the element 50 supports the flange 20 to limit distortion of the component 16 under loading applied by the vacuum bag 40. Although the element 50 may have other dimensions without departing from the scope of the present invention, in one embodiment the support element comprises a substantially annular plate having an outer diameter 52 (FIG. 2) generally equal to an outer diameter of the flange 20 and an inner diameter 54 (FIG. 2) generally equal to an inner diameter of the flange. Thus, the element 50 is sized generally diametrically equal to the flange 20. Although the element 50 may be made of other materials without departing from the scope of the present invention, in one embodiment the element is made of metal such as tool steel or aluminum.

Figure 5:
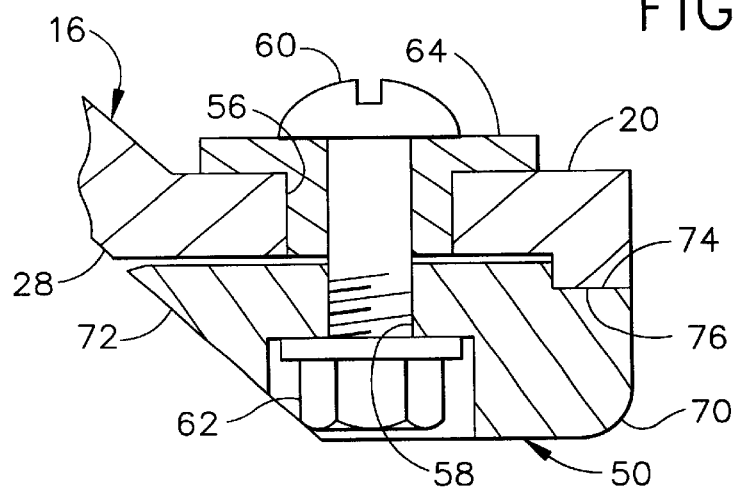
FIG. 5 is a detail of the section illustrated in FIG. 2.

As further illustrated in FIG. 5, the flange 20 includes a series of boltholes 56 (only one of which is shown) spaced around the flange for connecting the component 16 to the gas turbine engine 10 with bolts (not shown), and the support element 50 includes a series of boltholes 58 spaced around the element in a pattern corresponding to the series of boltholes spaced around the flange for connecting the element to the component with bolts 60 and nuts 62. Bushings 64 in the flange 20 of the component 16 protect the flange from damage. In addition, the support element 50 has a rounded edge 70 to prevent the edge from puncturing the vacuum bag 40. Further, the support element 50 has a tapered edge 72 to match the conical section 28 of the component 16. Still further, the support element 50 includes a relieved edge 74 for receiving a rabbet feature 76 of the flange 20 which is used to align the component 16 in the engine 10.

Figure 6:
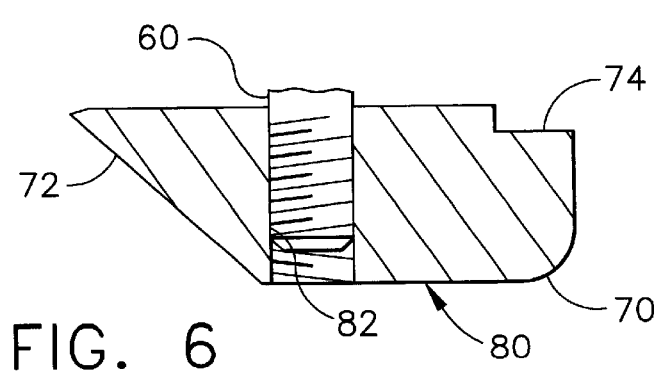
FIG. 6 is a detail similar to FIG. 5 showing an alternative attachment feature of a support element of a second embodiment.
Figure 7:
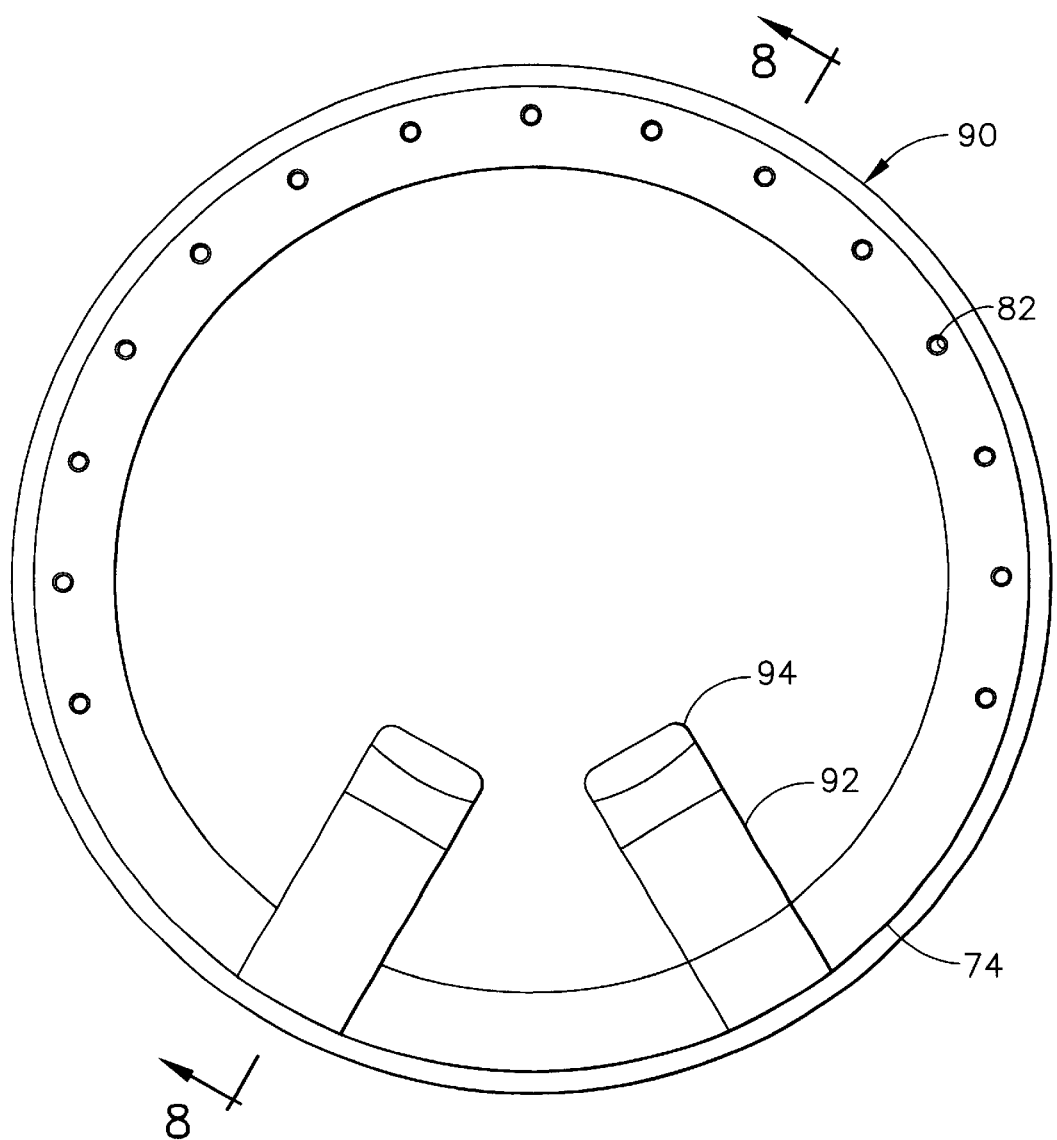
FIG. 7 is an end elevation of a support element of a third embodiment.
Figure 8:
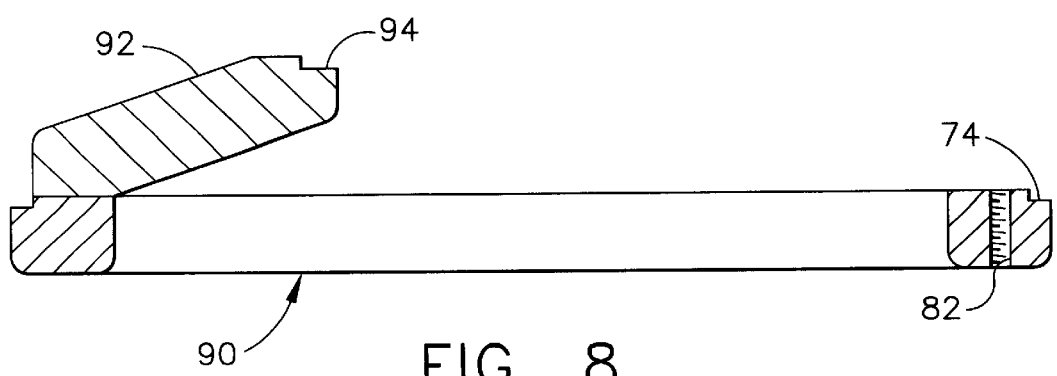
FIG. 8 is a section taken in the plane of line 8—8 of FIG. 7.

FIG. 6 illustrates a second embodiment of the support element 80 having threaded boltholes 82 to eliminate the nuts 62 used in the first embodiment. All other aspects of the second embodiment of the support element 80 are identical to those of the first embodiment of the support element 50. FIGS. 7 and 8 illustrate a third embodiment of the support element 90 which includes two arms 92 extending from the element for engaging the component 16 to brace the element against the component when the element is attached to the flange 20 of the component. Each of the arms 92 includes a shoulder 94 positioned for engaging the cylindrical seal housing 26 of the component 16 to limit distortion of the support element and the component 16 to limit distortion of the support element and the component. This embodiment is generally the same as the second embodiment in all other respects. Although the support element 90 of the third embodiment has two arms 92, those skilled in the art will appreciate that the support element may have fewer or more arms without departing from the scope of the present invention.

The previously described support elements 50, 80, 90 are used when preparing the gas turbine engine component 16 to be enclosed in a vacuum bag 40 as shown in FIG. 4. One of the support elements 50, 80, 90 is attached to the flange 20 with bolts 60 or by some alternative means to bridge the opposing ends 34, 36 of the flange and to prevent the ends from puncturing the vacuum bag 40 when installed over the flange. Further, the support elements 50, 80, 90 prevent the component 16 from distorting during repair of the abradable seals 30, 32.

Prior to replacing the seals 30, 32, the damaged seals are removed from the component 16 by any conventional means. For example, the damaged seals 30, 32 may be machined away using a conventional lathe. After machining, residual seal material and adhesive may be removed from the component using abrasive cloth. A replacement seal 30, 32 is fabricated by cutting a strip of seal material from a sheet. Although the replacement seals may be made from other materials without departing from the scope the present invention, in one embodiment the replacement seals are made from porous PTFE sheet. The seal material may be cleaned using a solvent such as acetone or alcohol, and dried in a clean, dust-free oven at an elevated temperature (e.g., about 130° F.). After drying, the seal material may be etched using a conventional process (e.g., AMS 2491).

Strips of two-sided adhesive film are cut to match the seal strips. Although the replacement seals may be attached to the component 16 using other conventional methods without departing from scope the present invention, in one embodiment the replacement seals are bonded to the component using adhesive such as Hysol EA9689 adhesive film available from Dexter Corporation of Seabrook, N.H. Hysol is a U.S. federally registered trademark of Dexter Corporation. The backing sheet from one side of each strip is removed and the adhesive strips are applied to a surface of the seal material. The backing sheets are removed from the other sides of the adhesive strips and the adhesive and seal material are applied to the previously prepared surfaces of the component 16.

Once the seal material is in place, a conventional vacuum bag 40 is installed around the component 16 and the support element 50 as illustrated in FIG. 4. The vacuum bag 40 may be pre-assembled or constructed from bagging film and seal tape. As will be apparent to those of ordinary skill the art, sharp corners of the component and/or the support element may be covered by cloth, release film and/or room temperature vulcanizing material to prevent the vacuum bag from being punctured. Once the vacuum bag is sealed around the component and support element, air is removed from the bag to produce a vacuum (e.g., about 24 in. Hg) in the bag and apply pressure to the seals 30, 32. After, the vacuum is drawn, the bag and component are placed in an oven at an elevated temperature (e.g., about 350° F.) and for an extended period of time (e.g., about 75 minutes) to cure the adhesive. After the adhesive is cured, the component is cooled to room temperature and the bag is removed. The seals may be machined to size using conventional machining techniques.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. In combination, a gas turbine engine component having a centerline and a partial flange for connecting the component to the gas turbine engine extending only partially around the centerline and terminating in spaced apart ends of the flange, and a support element releasably attached to the flange and extending between the ends of the flange for bridging the ends of the flange to prevent the ends from puncturing a vacuum bag when installed around the flange and to prevent the vacuum bag from distorting the component.

2. A combination as set forth in claim 1 wherein the support element comprises a substantially annular plate sized generally equal to the flange.

3. A combination as set forth in claim 1 wherein the flange includes a series of boltholes spaced around the flange for connecting the component to the gas turbine engine with bolts, and the support element includes a series of boltholes spaced around the element in a pattern corresponding to the series of boltholes spaced around the flange for connecting the element to the component with bolts.

4. A combination as set forth in claim 1 wherein the support element includes at least one rounded edge to prevent the edge from puncturing the vacuum bag.

5. A combination as set forth in claim 1 wherein the flange includes an inward facing rabbet feature for aligning the component with the gas turbine engine, and the support element includes a relieved edge for receiving the rabbet feature of the flange.

6. A combination as set forth in claim 1 wherein the support element includes at least one arm extending from the element for engaging the component to brace the element against the component when the element is attached to the flange of the component.

7. A method of preparing a gas turbine engine component for vacuum bagging, said component having a centerline and a partial flange for connecting the component to the gas turbine engine extending only partially around the centerline and terminating in spaced apart ends of the flange, said method comprising the step of attaching a support element to the flange to bridge the ends of the flange thereby preventing the ends from puncturing the vacuum bag and preventing the vacuum bag from distorting the component.

8. A method as set forth in claim 7 wherein the step of attaching the support element to the flange is accomplished by fastening the support element to the flange with bolts.

* * * * *